Oct. 14, 1930.  A. F. O'CONNOR  1,778,271
CHAIN ANCHOR FOR BRAKE GEARS
Original Filed Feb. 14, 1927    2 Sheets-Sheet 1
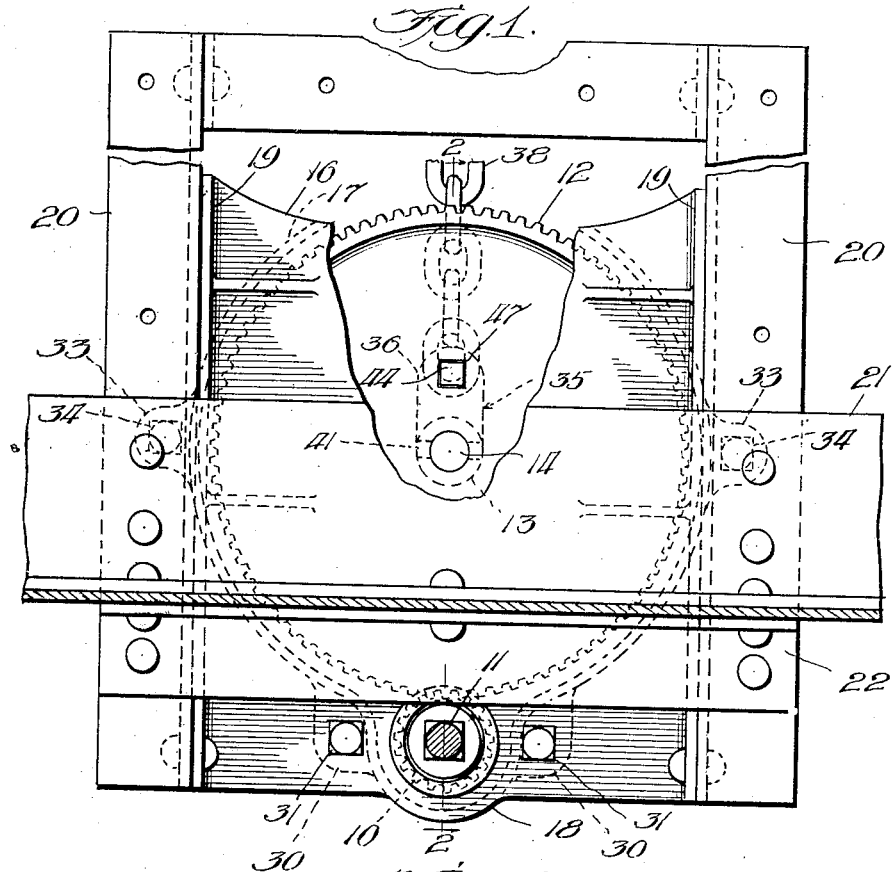
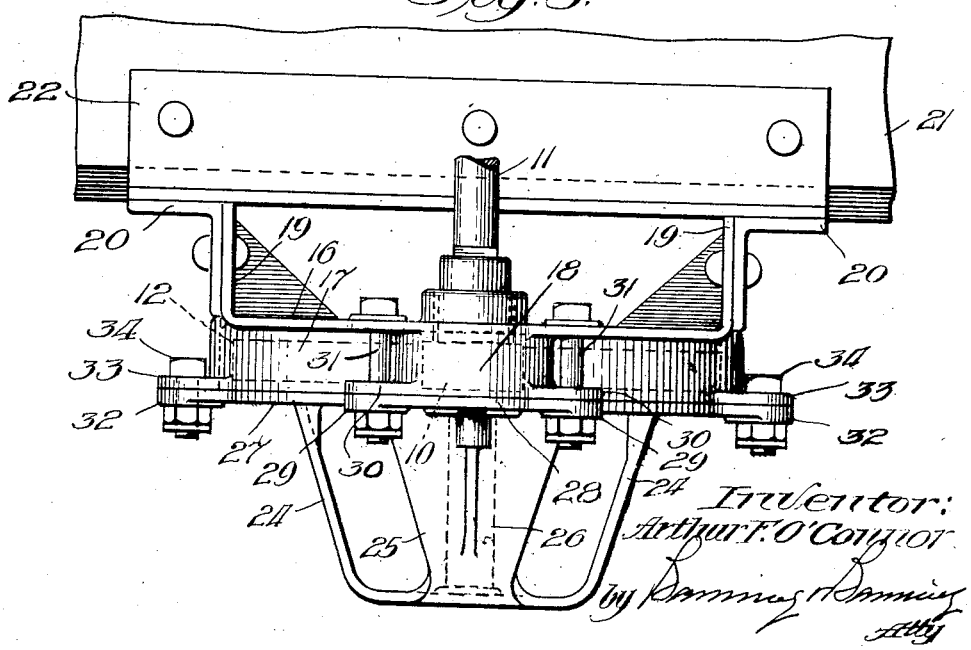
Inventor:
Arthur F. O'Connor

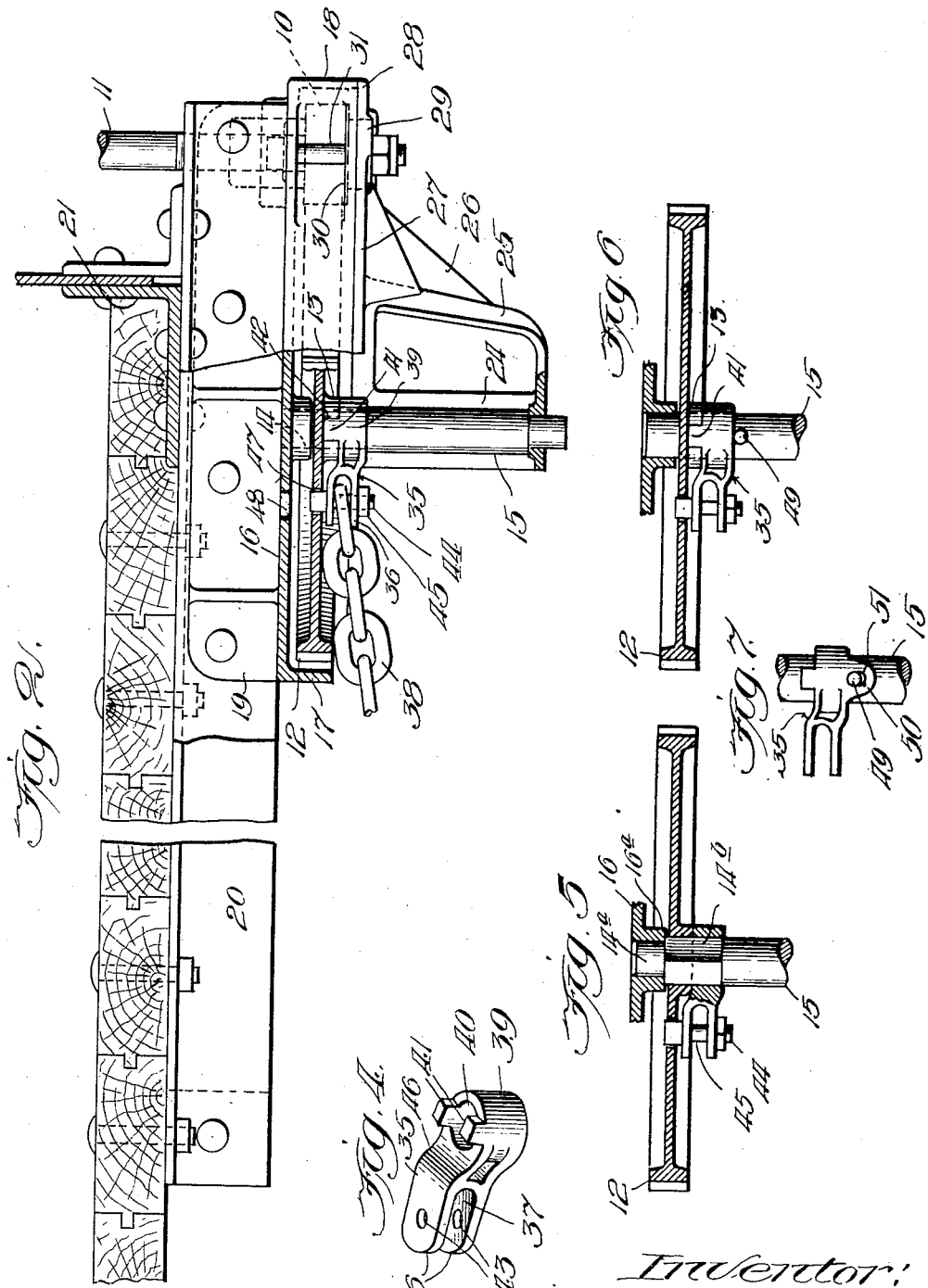

Patented Oct. 14, 1930

1,778,271

UNITED STATES PATENT OFFICE

ARTHUR F. O'CONNOR, OF CHICAGO, ILLINOIS, ASSIGNOR TO UNION RAILWAY EQUIPMENT COMPANY, OF CHICAGO, ILLINOIS, A CORPORATION OF ILLINOIS

CHAIN ANCHOR FOR BRAKE GEARS

Application filed February 14, 1927, Serial No. 167,931. Renewed March 1, 1930.

In the modern construction of hand brakes for freight cars, it is required that gearing be provided to enable the hand brake to apply a braking power equal to that afforded by air brakes, and to meet this requirement, gears have been employed for transmitting power from the hand wheel shaft to the chain winding drum with a view of increasing the power ratio to the required degree. In these circumstances, it is customary to secure the brake chain to some portion of the large gear, which is the winding element in the gear train, and in order to provide for a quick take up of the slack in the chain, so that the effective setting of the brakes may quickly follow, it is desirable that the brake chain swing on a relatively extended radius, so that a partial rotation only of the large gear is required in order to take up the slack.

The present invention is directed to the means provided for securing the winding end of the brake chain to the winding elements in such a way as to prevent the fouling or cramping of the chain, which sometimes occurs where one of the links of the chain has been attached to a lug or lugs depending from the web of the winding gear. This has been due to the fact that no adequate provision is made for permitting the chain to adapt itself to angular variation in its circuit around the drum.

The present invention is designed to make provision for the easy and convenient engagement or removal of the chain from the winding connection by suitable manipulation, and, at the same time, to guard against accidental displacement of the parts.

In the drawings:

Figure 1 is a plan view of the gear assembly of the present invention, partially broken away to show the position of the chain and connection therefor;

Fig. 2 is a view partially in section, the sectioned portion being taken on line 2—2 of Fig. 1;

Fig. 3 is a front view of the gear assembly;

Fig. 4 is a perspective view of the take-up lug or arm constituting the chain anchor of the present invention; and Figs. 5, 6 and 7 are modifications showing a different method of assembling the arm, shaft and gear wheel.

The gear assembly as a whole comprises a driving pinion 10 mounted upon the squared lower end of the main brake shaft 11, which pinion meshes with a large winding gear 12 provided with a hub 13 which is preferably freely mounted upon the reduced upper end 14 of a winding drum 15. The gear and pinion are mounted within a gear housing open on its underside and comprising a top plate 16 provided with a peripheral flange 17, the general configuration of the flange being circular with a protrusion 18 at its medial forward side for the purpose of housing the small driving pinion.

The top plate 16 of the gear housing, as shown, is of rectangular formation and provided along each of its side edges with an upstanding flange 19, which flanges are bolted between the downwardly extending flanges of a pair of spaced sills 20 which extend beneath and are riveted to the front cross sill 21 of the car. A reinforcing angle bar 22 is located within the angle between the front of the cross sill and the protruding front ends of the longitudinal sills 20 to provide additional securement and reinforcement at this point. The front edge of the housing top lies flush with the front ends of the longitudinal sills 20, and the brake shaft extends downwardly through the housing top at a point in advance of the reinforcing angle plate 22, as indicated in Fig. 1.

The lower reduced end of the drum shaft 15 is journaled through the web of a hanger bracket comprising side legs 24 and a medial front leg 25 reinforced by a rib 26, which legs at their upper ends merge into a substantially half circular rim 27 provided in its center front with an extension 28, configured to underlie the protruding wall flange 18 of the gear housing, and having laterally disposed lugs 29 which register with similarly positioned lugs 30 on the gear housing to which it is connected by means of vertical bolts 31, which also extend upwardly through the top wall of the housing. The main portion of the bracket rim follows the curvature of the main portion of the gear housing, and the rim is provided near each end with an outwardly projecting ear or lug 32 which registers with a similarly positioned lug 33 formed at each side of the gear housing, bolts 34 being provided to unite the parts together.

The anchor which more particularly forms the subject matter of the present invention is in the form of an upstanding arm 35 of bifurcated formation at its free end 36 to afford a recess 37 for the reception of the brake chain 38. The head end 39 of the arm is provided with a bore 40, and on each side of the bore is an outstanding lug 41 which registers with a notch 42 in the gear hub 13. The arm and gear hub, in one form of construction, are both freely mounted upon the reduced upper end 14 of the drum 15, so that a turning movement will be imparted to the arm by reason of its direct engagement with the hub of the gear.

Figure 5 shows one modification in the arrangement for mounting the arm. In this case, the drum is provided below its reduced journal end 14$^a$, which journals within a boss 16$^a$ in the top plate of the housing, with a squared section 14$^b$ which receives both the arm and the gear, so that in this instance the gear, drum and arm will all be interlocked and move together, so that the connection between the gear and the arm is indirectly through the drum rather than by direct engagement, as in the case first mentioned.

In Fig. 6 the gear and arm are both freely mounted upon the upper end of the drum and held in interlocking relation by the provision of a pin 49. In Fig. 7, the arrangement is similar except for the fact that the head of the arm is provided with a pair of depending ears 50, each having formed in it a vertically elongated slot 51 which receives the pin 49, the arrangement in this case being better adapted to prevent wear on the pin than the arrangement shown in Fig. 6. Although the arm is shown as lying in immediate contact with the hub of the gear, it might be elsewhere located on the drum without substantial variation in principle or mode of operation.

The bifurcated end of the arm, wherever mounted, is provided with vertically registering holes 43 through which is entered a headed bolt 44 carrying a nut 45 at its lower end, and this bolt furnishes the anchorage for the terminal link of the brake chain 38. In order to provide for the easy and convenient insertion of the bolt, it is desirable to have the upper section of the bifurcated arm upwardly shouldered or offset at the point 46 to bring the upper section into close relation with the web of the overlying gear wheel, and to provide an aperture 47 in the web in register with the apertures 43 in the ends of the arm, so that the bolt 44 may be more readily inserted into place from above, and for the same reason, it is also desirable to provide a suitably disposed aperture 48 in the top plate of the gear housing, so that when the brake is released and the chain slacked and the arm turned to its rearmost position, the several apertures will be in alignment which will permit the bolt to be readily dropped into position through the terminal link of the brake chain, or to be removed therefrom as occasion may require.

This method of inserting and socketing the head of the bolt not only serves to provide a convenient way of assembly, but also affords a direct engagement between the web of the gear wheel and the bolt, thereby, in effect, uniting the arm to an intermediate portion of the gear which serves to relieve the head of the arm from torsional strain. Of course, where a spoked gear is employed, the provision of the aperture 47 will be unnecessary.

In use, with the chain slack, the arm will occupy a rearwardly extending position, but as soon as the hand brake wheel (not shown) is turned, the winding gear will impart a swinging movement to the arm, which is of a length to quickly take up the slack in the chain, and as the arm swings outwardly and forwardly, the terminal link will swivel on the anchor bolt, so that the links of the chain will maintain their relation to the line of draft regardless of angular variations in the position of the arm.

As the arm swings past the forward medial position, the chain will be laid against the side of the drum, and the drum will thereafter serve to receive the coils or convolutions of the chain as the braking proceeds. The arrangement is one which not only affords the means for a quick take up for the slack, but also prevents fouling of the chain and lays the coils or convolutions evenly upon the drum as the brake is tightened. By providing an arm of the character indicated, which is carried by the drum, the gear will be largely relieved from the strains incidental to the winding operation.

Although several methods have been described for mounting the arm in operative relation to the gear and drum, it is obvious that other methods of securing the necessary engaging relation of two or more of these elements may be employed without departing from the spirit of the invention.

I claim:

1. In a chain anchor for brake gears, the combination of a winding gear, a drum with which said gear is rotatably associated, means for imparting rotation to the gear, an arm mounted upon the drum and in fixed relation with and rotatable with the gear, a brake chain, and means for connecting the brake chain to the arm, substantially as described.

2. In a chain anchor for brake gears, the combination of a winding gear, a drum with which said gear is rotatably associated, means for imparting rotation to the gear, an arm mounted upon the drum and in fixed relation with and rotatable with the gear, a brake chain, and a vertically disposed pin carried by the arm and entered through a link of the chain, substantially as described.

3. In a chain anchor for brake gears, the combination of a winding gear, a drum with which said gear is rotatably associated, means for imparting rotation to the gear, an arm mounted upon the drum and in fixed relation with and rotatable with the gear, said arm being bifurcated at its free end, a brake chain having one of its links between the bifurcations of the arm, and a pin entered through the bifurcated arm and through the link, substantially as described.

4. In a chain anchor for brake gears, the combination of a winding gear, a pinion meshing therewith, a hand wheel shaft upon which the pinion is mounted, a drum depending below the gear and upon which the gear is mounted, an arm carried at the upper end of the drum, leaving the lower portion of the drum unobstructed for the winding of the chain, said arm lying in proximate relation to and below the gear and rotatable with the gear, the free end of the arm being inwardly slotted to afford an upper portion lying parallel with the plane of the gear and in close relation thereto, and a lower portion also lying parallel with the plane of the gear and separated from the upper portion by an amount slightly greater than the thickness of a chain link and less than the width of a chain link of the brake chain for which the anchor is intended, to hold the chain against climbing upwardly over the rim of the gear, the upper and lower portions of the arm being provided with registering apertures, a headed bolt entered through the apertures in the arm and having its head contacting with the upper face of the upper portion of the arm and projecting upwardly into the plane of the gear, and a brake chain having one of its links lying flatwise between the upper and lower portions of the arm and having said bolt entered through said link, the relation of the link and bolt being such as to hold the connected link in swiveling relation to said bolt and to permit the next link to swing freely clear of the ends of said arm portions, and to permit the chain to wind in spiral convolutions and in a lower plane upon the drum depending below the arm.

5. In a chain anchor for brake gears, the combination of a winding gear, a pinion meshing therewith, a hand wheel upon which the pinion is mounted, a drum depending below the gear and upon which the gear is mounted, an arm carried at the upper end of the drum, leaving the lower portion of the drum unobstructed for the winding of the chain, said arm lying in proximate relation to and below the gear and rotatable with the gear, the free end of the arm being inwardly slotted to afford an upper portion lying parallel with the plane of the gear and in close relation thereto, and a lower portion also lying parallel with the plane of the gear and separated from the upper portion by an amount slightly greater than the thickness of a chain link and less than the width of a chain link of the brake chain for which the anchor is intended, to hold the chain against climbing upwardly over the rim of the gear, the upper and lower portions of the arm being provided with registering apertures, and the gear having an aperture in its web in register therewith, a headed bolt entered through the apertures in the arm and having its head contacting with the upper face of the upper portion of the arm, and a brake chain having one of its links lying flatwise between the upper and lower portions of the arm and having said bolt entered through said link, the relation of the link and the bolt being such as to hold the connected link in swiveling relation to said bolt and to permit the next link to swing freely clear of the ends of said arm portions and to permit the chain to wind in spiral convolutions and in a lower plane upon the drum depending below the arm.

6. In a chain anchor for brake gears, the combination of a relatively large winding gear, of a relatively small pinion meshing therewith, a hand wheel shaft upon which the pinion is carried, a hub for the winding gear, a drum having its end freely entered through the gear, means for journaling the ends of the drum, an arm freely mounted upon the drum below the gear hub, the arm and hub being interlocked with one another, the free end of the arm being bifurcated to afford horizontally disposed upper and lower sections provided with registering apertures, a pin entered through said apertures, and a brake chain having one of its links in engagement with said pin, substantially as described.

7. In a chain anchor for brake gears, the combination of a relatively large winding gear, of a relatively small pinion meshing therewith, a hand wheel shaft upon which the pinion is carried, a hub for the winding gear, a drum having its end freely entered through the gear, means for journaling the ends of the drum, an arm freely mounted upon the drum below the gear hub, the arm and hub being interlocked with one another, the free end of the arm being bifurcated to afford horizontally disposed upper and lower sections provided with registering apertures, a pin entered through said apertures, and a brake chain having one of its links in engagement with said pin, the gear being provided with a registering aperture, and the pin being provided with a head in engaging relation with said aperture, substantially as described.

ARTHUR F. O'CONNOR.